(12) United States Patent
Albers et al.

(10) Patent No.: US 7,663,737 B2
(45) Date of Patent: Feb. 16, 2010

(54) ELECTROMAGNETIC RADIATION MONITORING SENSOR DEVICE

(75) Inventors: Bas Albers, Chur (CH); Beat De Coi, Sargans (CH); Peter Nebiker, Malans (CH)

(73) Assignee: Cedes AG, Landquart (CH)

( * ) Notice: Subject to any disclaimer, the term of this patent is extended or adjusted under 35 U.S.C. 154(b) by 0 days.

(21) Appl. No.: 12/019,075

(22) Filed: Jan. 24, 2008

(65) Prior Publication Data

US 2008/0117407 A1    May 22, 2008

Related U.S. Application Data

(63) Continuation of application No. PCT/EP2006/005921, filed on Jun. 21, 2006.

(51) Int. Cl.
G01C 3/08 (2006.01)
(52) U.S. Cl. .................. 356/5.01; 356/3.08; 356/5.1
(58) Field of Classification Search ............. 356/3.01, 356/3.08, 4.01–5.15, 337, 342
See application file for complete search history.

(56) References Cited

U.S. PATENT DOCUMENTS 6,573,859 B2 *  6/2003  Tokoro .................. 342/70
6,724,467 B1    4/2004  Billmers et al.
7,117,101 B2 * 10/2006  Ohzu et al. ............. 702/29
7,388,662 B2 *  6/2008  Cantin et al. ........... 356/338
7,541,588 B2 *  6/2009  Tabirian et al. ......... 250/341.1
2002/0118352 A1  8/2002  Ohzu et al.

FOREIGN PATENT DOCUMENTS

| DE | 195 07 407 A1 | 9/1995 |
| DE | 197 57 595 A1 | 7/1999 |
| DE | 100 46 992 C1 | 6/2002 |
| DE | 101 63 534 A1 | 7/2003 |
| JP | 2004-323140 A1 | 11/2004 |

* cited by examiner

Primary Examiner—Isam Alsomiri
(74) Attorney, Agent, or Firm—Burr & Brown

(57) ABSTRACT

A sensor device including a source for electromagnetic radiation, a plurality of receivers for the electromagnetic radiation, and an electronics unit designed to transmit electromagnetic radiation by means of the source and to determine a distance which the electromagnetic radiation emitted from the source travels from the reflection surface of an object to respective receivers by evaluation of the delay time of the electromagnetic radiation and/or the phase of an oscillation modulated on to the electromagnetic radiation. The electronics unit for the detection of reflective objects, which are like floating parts and are distributed in three dimensions in a medium, is able to determine from the measured distances a first group of distances which fit a predetermined distribution, and, if there is more than one group member, to emit a signal which is associated with the detection of reflective objects which are like floating parts.

18 Claims, 1 Drawing Sheet

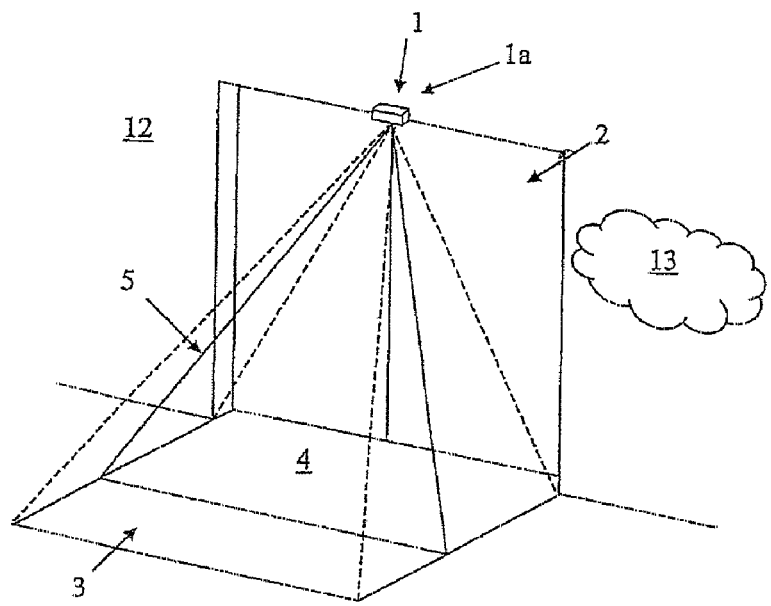
Figure 1
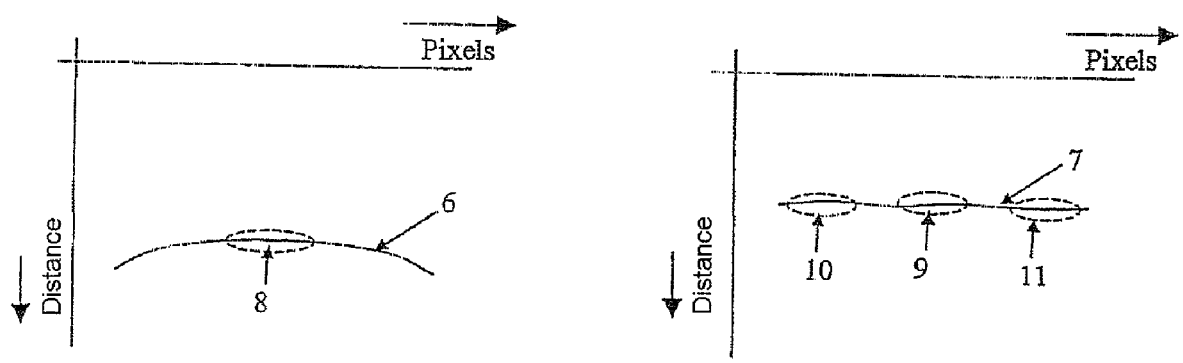
Figure 2
Figure 3

ELECTROMAGNETIC RADIATION MONITORING SENSOR DEVICE

CROSS REFERENCE TO RELATED APPLICATIONS

This application is a continuation of International Application No. PCT/EP2006/005921, filed Jun. 21, 2006, and claims the benefit under 35 USC 119(a)-(d) of German Application No. 10 2005 036 417.9, filed Jul. 29, 2005, and German Application No. 10 2005 045 484.4, filed Sep. 22, 2005, the entireties of which are incorporated herein by reference.

FIELD OF THE INVENTION

The invention relates to a sensor device comprising a source for electromagnetic radiation, in particular light, a plurality of receivers which can be evaluated separately for the electromagnetic radiation, and an electronics unit.

BACKGROUND OF THE INVENTION

There are now a vast number of technical devices, in which sensors monitor widely differing processes. In this case, objects which are like floating parts, for example dust, water droplets, smoke, also referred to in the following text as aerosols or else snow as well as gas bubbles, interfere with the monitoring processes in the detection area of the sensors.

By way of example in the case of an elevator, for example a passenger elevator in a building, the automatic elevator doors are normally monitored to determine whether an object is located in their movement path. If this is the case, the doors are not closed in order to ensure that no collision can occur, for example with a person. In normal conditions, this is undoubtedly a correct approach. However, in the event of a fire, serious problems can occur, since it is not possible to distinguish between smoke and an object. The following scenario may occur:

An elevator comes to rest at a floor where there is a fire. The door opens and the smoke enters the elevator cabin. People in the elevator wish to leave that floor again as quickly as possible. However, this is not possible because the door sensor identifies the smoke as an object and therefore a control system does not allow the elevator doors to be closed. People have already lost their lives in a situation such as this.

SUMMARY OF THE INVENTION

The invention is based on the object of developing a sensor device of the type described initially such that the sensor device is less sensitive to interference from reflective objects which are like floating parts in the area monitored by the sensor.

The invention is based on a sensor device which has a source for electromagnetic radiation, in particular light, preferably infrared light, a plurality of receivers, which can be evaluated separately, for the electromagnetic radiation and an electronics unit, which is designed to transmit electromagnetic radiation by means of the source and to determine a distance which the electromagnetic radiation emitted from the source travels from the reflection surface of an object to the respective receiver by evaluation of the delay time of the electromagnetic radiation and/or the phase of an oscillation modulated on to the electromagnetic radiation. The essence of the invention is now that the electronics unit for the detection of reflective objects which are like floating parts and are distributed in three dimensions in a medium is able to determine from the measured distances a first group of distances which fit a predetermined distribution, in particular at approximately identical distances for predefined receivers and, if there is more than one group member, to emit a signal which is associated with the detection of reflective objects which are like floating parts.

This procedure makes it possible for a sensor which measures distances in the described manner to be used to detect particles located in a medium. A cost-effective solution is therefore offered in order to use these sensors for example as smoke or fog sensors. A sensor such as this could also monitor the number of air bubbles in a liquid.

The invention is in this case based on the discovery that comparatively small reflective objects which are like floating parts, and are distributed in three dimensions, in particular finely, for example aerosols, snow or air bubbles, reflect the emitted electromagnetic radiation, in particular light, in such a way that a typical distance is measured depending on the nature and density of the distribution of the reflective objects which are like floating parts.

A uniform distribution results in a single, identical distance. Since, however, it is never known in advance exactly how a distribution will appear, evaluation is preferably carried out by categorization of the distances. For example, a statement which becomes more reliable can be made about the presence of reflective objects which are like floating parts, the more similar the distances are.

In one advantageous refinement of the invention, a category formation process may appear such that the first group contains distances which differ by less than 30%. However, it is also feasible for the threshold to be reduced to 15% or 5%. As the tolerance band becomes narrower, the confidence for detection of reflective objects which are like floating parts can be increased.

Owing to the finite measurement accuracy, it is possible for the sensor to measure distances which are of approximately the same magnitude when a flat surface is located in the detection area. In order not to incorrectly deduce the presence of reflective objects which are like floating parts, it is advantageous to compare with one another for group formation only distances which originate from receivers with a predetermined geometric arrangement with respect to one another. If distances are measured in different directions, then the respective distance to a flat surface is not constant. Only a spherical surface with appropriate positioning with respect to the source would lead to equal measured distances. However, since it is highly improbable that the scenario which the sensor detects will have this form, this special case can be ignored.

It is also feasible for objects whose distances to the receivers are the same to be located in the monitoring area of the sensor device. Since, however, a cloud or a field of reflective objects which are like floating parts are now located in a medium always spread over a certain area, it is possible to deduce the presence of reflective objects which are like floating parts when a plurality of adjacent distances are in each case approximately the same.

In order to further reduce the risk of incorrect detection, the number of group members in the first group should be at least greater than 5, preferably greater than 10, and possibly even greater than 20.

Objects which are located close to the sensor may reflect sufficient light in order to measure an effective distance even though, for example, smoke is present. This would mean that an object could thus prevent the detection of smoke. It is therefore advantageous for the electronics unit to be designed to also deal with distances which are less than the mean value of approximately equal distances as members of the first group. A procedure such as this should be used in particular when the receivers of the approximately equal distances are geometrically adjacent to the one or more receivers which are measuring the short distance or distances.

It is also advantageous for the capabilities of the sensor to be additionally used for other detection tasks, in addition to the detection of reflective objects which are like floating parts. The electronics unit is preferably designed to detect the presence and/or movement of objects which are considerably larger than the reflective objects which are like floating parts, as a function of the measured distances.

If, furthermore, the electronics unit is designed, for example, to determine the intensity of received light in particular for the various receivers, the presence and/or the movement of an object can be detected on this basis. This makes it possible, for example, to evaluate gray-scale images.

In one further possible refinement, the electronics units is designed to control a driven moving element, for example a door.

Exceptionally, it must therefore be expected that the sensor will be damaged or at least greatly adversely affected as soon as reflective objects which are like floating parts are detected. For example, this can be caused by smoke or flames in the event of a fire. In consequence, distances may possibly no longer be detected correctly, as a result of which the sensor device incorrectly signals that no reflective objects which are like floating parts are present. In one preferred refinement, it is therefore advantageous for the electronics unit to be designed such that, when reflective objects which are like floating parts have been detected, the electronics unit will emit the corresponding signal continuously even if the basis for this signal disappears, because no more reflective objects which are like floating parts are detected.

In one particularly preferred embodiment, the receivers are pixels of a camera chip, for example of a CMOS or CCD chip. This makes it possible to accommodate a large number of receivers in a small area, at low cost.

A field of distributed small reflective objects which are like floating parts may have regions with different densities. This means that the same distance is not measured in each direction, even when the sensor device is completely surrounded by the field of reflective objects which are like floating parts. In order to avoid misinterpretations resulting from this, the following text proposes that, if the electronics unit determines from the distances not only the first group but also a second group of predetermined distances, for example distances which are approximately the same but differ from the first group, the distances of the second group will be dealt with in a manner corresponding to that of the first group, as if one group were present.

In order to ensure that the distance measurements are sufficiently accurate, the distances can be determined from a plurality of distance measurements. For example, a plurality of distance measurements may be carried out sequentially and successively for each receiver, in order to use this to calculate one distance. Any statistical methods may be used for this purpose.

BRIEF DESCRIPTION OF THE DRAWINGS

Exemplary embodiments of the invention are illustrated in the drawings.

FIG. 1 shows a schematic, three-dimensional illustration of an optical sensor arrangement on a two-vane sliding door with a smoke cloud indicated; and FIGS. 2 and 3 show graphs in which the respectively associated distance is plotted for pixels of a receiver unit which comprises a large number of pixels and on which a line area is imaged.

DETAILED DESCRIPTION OF THE INVENTION

FIG. 1 shows a schematic three-dimensional view of an optical door sensor arrangement 1 on a two-vane sliding door 2 with an optical sensor 1a over the two door vanes. The detection area 4 of the sensor 1a is illustrated schematically by dashed lines, which originate from the sensor 1a and end at a floor surface 3. An area including the air 12 in front of the sliding doors 2 is accordingly covered. The floor area 3 covers the area in front of the sliding door 2. Only an area 5 of the monitoring area 4 will be considered in the following text, for simplicity. The sensor 1a has a camera chip which records distance images of the detection area 4.

The distances measured in the area 5 are shown in FIGS. 2 and 3. The x axis corresponds to pixels of the sensor 1a on which the monitoring area is imaged. The associated measured distances are plotted on the y axis. The curve 6 represents the measured distances.

FIG. 2 shows the measured distances in the situation as illustrated in FIG. 1. Although the floor in the monitoring area 4 is flat, the measured distances form the curve 6. This is because the distance from the sensor 1a to the floor 3 increases from the center toward the edge of the monitoring area 4.

If the sensor is completely surrounded by an essentially homogeneous aerosol field, then the sensor 1a will measure approximately the same distance in all directions. This is the case, for example, when a smoke cloud 13 (indicated in FIG. 1) has moved in front of the sensor 1a.

The corresponding distance measurement is illustrated in FIG. 3. The distances of the areas 9, 10 and 11 are approximately the same. Since the areas 9, 10 and 11 are furthermore a comparatively long distance apart from one another, the detection of smoke can reliably be deduced. The distances in the areas 9, 10 and 11 in FIG. 3 in this case differ in the case of the example by less than 5% from the longest to the shortest measured distance. Furthermore, the distances between the individual areas 9, 10 and 11 are also within a corresponding fluctuation range, thus making it possible to deduce, with a comparatively high degree of confidence, the detection of reflective objects which are like floating parts, such as smoke in the present exemplary embodiment.

In FIG. 2, the distances within the area 8 could likewise be interpreted as smoke, because these are likewise within a narrow fluctuation range. Since, however, the associated pixels are located comparatively close together, this represents an exclusion criterion for the detection of reflective objects, such as smoke, which are like floating parts.

We claim:

1. A sensor device comprising a source for electromagnetic radiation, a plurality of receivers for the electromagnetic radiation, and an electronics unit, wherein the electronics unit transmits electromagnetic radiation from the electromagnetic source and the plurality of receivers receive electromagnetic radiation reflected from a reflection surface of an object to determine a distance which the electromagnetic radiation emitted from the source travels from the reflection surface of the object to the respective receiver by evaluation of at least one of the delay time of the electromagnetic radiation and the phase of an oscillation modulated on to the electromagnetic radiation, wherein each of the plurality of receivers is evaluated individually, the electronics unit detects reflective objects, which are like floating parts and are distributed in three dimensions in a medium, by determining from the measured distances a first group of distances which fit a predetermined distribution and the sensor device emits a signal which is associated with the detection of reflective objects which are like floating parts when the first group of distances contains more than one group member.

2. The device of claim 1, wherein the first group contains distances which differ by less than 30%.

3. The device of claim 1, wherein the distances which are compared for formation of the first group of distances are from a subset of the plurality of receivers that have a specific geometric arrangement with respect to one another.

4. The device of claim 1, wherein the number of group members in the first group must be greater than 5, for the electronics unit to pass on a signal which is associated with the detection of reflective objects which are like floating parts.

5. The device of claim 1, wherein the electronics unit evaluates distances which are less than the mean value of approximately equal distances as members of the first group.

6. The device of claim 1, wherein the electronics unit detects at least one of the presence and movement of objects, which are considerably larger than the reflective objects which are like floating parts, as a function of the measured distances.

7. The device of claim 1, wherein the electronics unit determines the intensity of the received electromagnetic radiation.

8. The device of claim 7, wherein the received electromagnetic radiation is light.

9. The device of claim 1, wherein the electronics units controls a driven moving element.

10. The device of claim 9, wherein the driven moving element is a door.

11. The device of claim 1, wherein, the electronics unit continuously emits an appropriate signal when reflective objects which are like floating parts have been detected.

12. The device of claim 11, wherein the electronics unit continues to emit the appropriate signal even when no more reflective objects, which are like floating parts, are detected.

13. The device of claim 1, wherein each of the plurality of receivers comprises a camera chip.

14. The device of claim 1, wherein the electronics unit determines from the distances measured not only the first group but also a second group of approximately equal distances, and the distances of the second group and the distances of the first group are dealt with as if only one group were present.

15. The device of claim 1, wherein the first group contains distances which differ by less than 15%.

16. The device of claim 1, wherein the first group contains distances which differ by less than 5%.

17. The device of claim 1, wherein the electromagnetic radiation is light.

18. The device of claim 1, wherein the first group of distances are approximately identified distances for at least a predetermined subset of the plurality of receivers.

* * * * *

UNITED STATES PATENT AND TRADEMARK OFFICE
CERTIFICATE OF CORRECTION

PATENT NO. : 7,663,737 B2  Page 1 of 1
APPLICATION NO. : 12/019075
DATED : February 16, 2010
INVENTOR(S) : Albers et al.

It is certified that error appears in the above-identified patent and that said Letters Patent is hereby corrected as shown below:

Title Page

*Please add*:

Item (30), Foreign Application Priority Data

July 29, 2005       (DE) ....... 10 2005 036 417.9

September 22, 2005  (DE) ....... 10 2005 045 484.4

Signed and Sealed this

Twenty-seventh Day of April, 2010

David J. Kappos
*Director of the United States Patent and Trademark Office*